May 28, 1929.　　　C. WOGSTAD ET AL　　　1,715,216
CORN HARVESTER
Filed Feb. 19, 1925　　　2 Sheets-Sheet 1

Carl Wogstad
Andrew O Wogstad
INVENTOR

BY Victor J. Evans
ATTORNEY

WITNESS: J.T.L. Wright

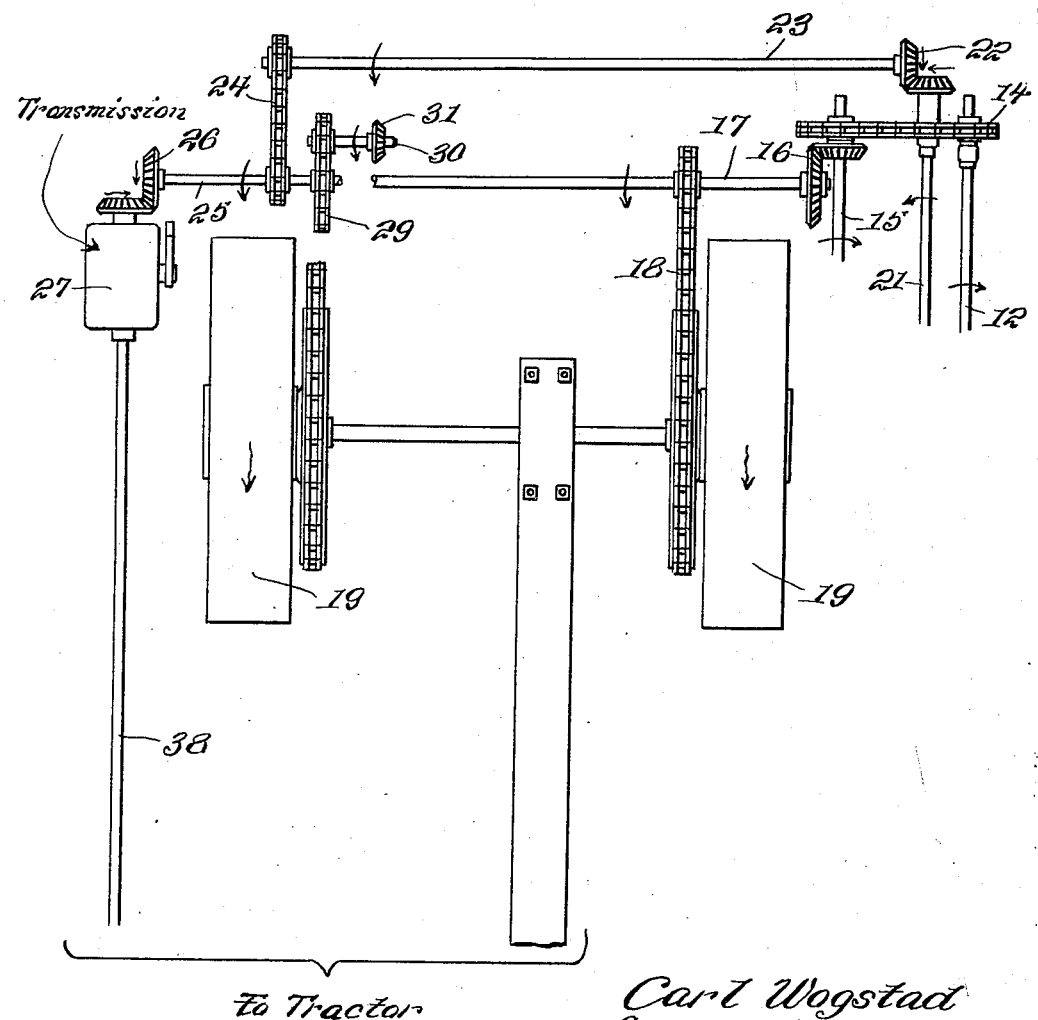

Patented May 28, 1929.

1,715,216

UNITED STATES PATENT OFFICE.

CARL WOGSTAD AND ANDREW O. WOGSTAD, OF DEER CREEK TOWNSHIP, WORTH COUNTY, IOWA.

CORN HARVESTER.

Application filed February 19, 1925. Serial No. 10,364.

This invention relates to corn harvesting machines and has for an object the provision of a machine in which the speed of the gathering chains will at all times conform to the speed of forward movement of the machine, while the speed of the snapping and husking rolls and the conveyor chain may be varied in accordance with the work they are to perform.

Another object of the invention is the provision of a corn harvesting machine constructed so that the same power unit utilized for propelling the machine may also be used for operating the snapping and husking rolls and the conveyor chain, while the gathering chains are driven from the bull wheel so as to maintain a proper ratio of speed.

With the above and other objects in view, the invention further includes the following novel features and details of construction, to be hereinafter more fully described, illustrated in the accompanying drawings and pointed out in the appended claim.

In the drawings:—

Figure 2 is a skeletonized plan view illustrating the means whereby a single power unit may be employed for propelling the machine and for operating the snapping and husking rolls and the conveyor chain.

Figure 1:
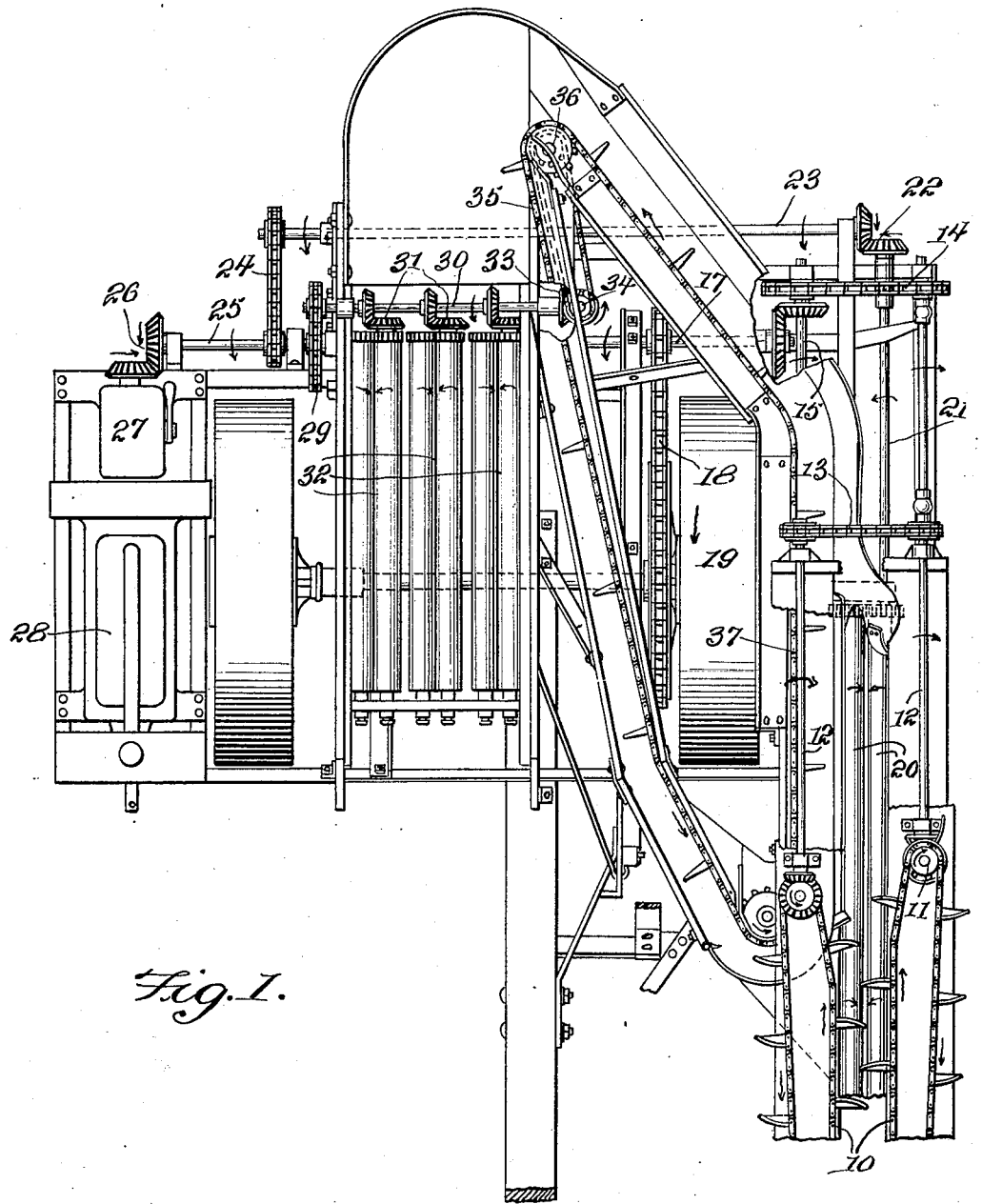
Figure 1 is a plan view of a corn husking machine constructed in accordance with the invention.

Referring to the drawings in detail wherein like characters of reference denote corresponding parts, the gathering chains of the machine are indicated at 10. These chains operate around sprockets 11 which are driven from shafts 12, the shafts having a chain and sprocket connection 13 so that power from one shaft may be utilized for driving the other shaft. The shaft 12 which forms the driving shaft for the gathering chains is driven by a chain and sprocket connection 14 with a shaft 15, while the latter is geared as indicated at 16 to a shaft 17. This last mentioned shaft has a chain and sprocket connection 18 with the bull wheel 19 of the machine, so that the gathering chains will be driven at a speed proportionate with the forward travelling of the machine.

The snapping rolls which are indicated at 20 are driven from a shaft 21 and the latter is geared as indicated at 22 to a cross shaft 23. This shaft 23 has a chain and sprocket connection 24 with a countershaft 25, this last mentioned shaft being geared as indicated at 26 with the transmission mechanism contained within a housing 27. The transmission mechanism is driven by an engine 28 which is mounted upon the frame of the machine.

The shaft 25 has a chain and sprocket connection 29 with a shaft 30 and this last mentioned shaft is geared as indicated at 31 with the husking rolls 32 for the purpose of operating the latter. The shaft 30 is also geared as indicated at 33 with a shaft 34 and the latter has a chain and sprocket connection 35 with the drive shaft 36 of the conveyor chain 37.

It will be apparent by reference to Figure 1 of the drawings that the gathering chains 10 being geared to the bull wheel, will operate at a speed proportionate to the speed of forward movement of the machine. The snapping rolls 20, husking rolls 32 and conveyor chain 37 being geared to the engine driven transmission mechanism, will be driven by the engine and their speed of operation may be controlled in accordance with the work to be done. This provides a machine which may properly take care of the work of snapping, conveying and husking without increasing or decreasing the speed of operation of the gathering chains.

In Figure 2 of the drawings the arrangement is substantially the same except that the transmission mechanism contained within the housing 27 may be operatively connected to a tractor (not shown) and the power of the latter utilized for propelling the harvesting machine. To accomplish this the transmission mechanism has extending therefrom a relatively long shaft 38 which may be connected in any suitable manner with the tractor mechanism, while the gathering chains may be driven from the bull wheels 19 after the manner previously described. A single power unit may thus be utilized to propel the machine and to operate the snapping, and husking rolls in the conveyor chain. While the mechanism is described as connected to a tractor, it is obvious that the machine and tractor may be constructed as a single unit, the purpose of the invention being to drive the harvesting machine and its mechanism exclusive of the gathering chains, from a single power unit.

The invention is susceptible of various changes in its form, proportions and minor details of construction and the right is herein reserved to make such changes as properly fall within the scope of the appended claim.

Having described the invention what is claimed is:—

A corn harvester including gathering chains, a bull wheel, a drive shaft, parallel shafts operatively connecting with the gathering chains and being operatively connected, one shaft operating the other, with means connecting the drive shaft and the bull wheel, actuating the chains at a speed proportionate to the speed of the travel of the machine, snapping rolls having portions adjacent to and below the said chains, husking rolls remote from the snapping rolls, an operating means on the frame, operative gear connections with the snapping rolls and husking rolls, and in turn operatively connecting with the operating means on the frame, to put the snapping and husking rolls into operation, and means for regulating the speed of operation with which the snapping and husking rolls actuate.

In testimony whereof we affix our signatures.

CARL WOGSTAD.
ANDREW O. WOGSTAD.